(12) United States Patent
Pentenrieder et al.

(10) Patent No.: US 7,768,534 B2
(45) Date of Patent: Aug. 3, 2010

(54) METHOD OF AND SYSTEM FOR DETERMINING INACCURACY INFORMATION IN AN AUGMENTED REALITY SYSTEM

(75) Inventors: Katharina Pentenrieder, Starnberg (DE); Peter Meier, Munich (DE)

(73) Assignee: Metaio GmbH, Munich (DE)

( * ) Notice: Subject to any disclaimer, the term of this patent is extended or adjusted under 35 U.S.C. 154(b) by 743 days.

(21) Appl. No.: 11/614,155

(22) Filed: Dec. 21, 2006

(65) Prior Publication Data

US 2007/0146391 A1 Jun. 28, 2007

(30) Foreign Application Priority Data

Dec. 23, 2005 (DE) .................. 10 2005 061 952

(51) Int. Cl.
*G09G 5/00* (2006.01)
(52) U.S. Cl. ..................... 345/633; 345/619
(58) Field of Classification Search .............. 345/633, 345/619
See application file for complete search history.

(56) References Cited

U.S. PATENT DOCUMENTS

2005/0215879 A1* 9/2005 Chuanggui .................. 600/407
2006/0050087 A1* 3/2006 Tanimura et al. ............ 345/629

FOREIGN PATENT DOCUMENTS

DE 10128015 6/2001

OTHER PUBLICATIONS

Electronics and Communication in Japan, Part 2, vol. 90, No. 8, dated 2007 as translated from original Denshi vol. J87-D-II, No. 1, Jan. 2004.
A survey of augmented reality (1995).
Robust visual tracking for non-instrumented augmented reality (2003).
Hoff W, Vincent T. Analysis of Head Pose Accuracy in Augmented Reality. IEEE Transactions on Visualization and Computer Graphics 6, 4 (Oct. 2000), 319-334.
Coelho EM, Julier SJ, Macintyre B. Osgar: A Scene Graph with Uncertain Transformation. Proc Third IEEE and ACM Int Sym Mixed and Aug Real, (Nov. 2-5, 2004), 6-15.
Guide to the expression of uncertainty in measurement. ISO, (1995), Switzerland.
Luhmann T. Nahbereichsphotogrammetrie. Wichmann-Verlag, Heidelberg, 2000. Chapter 7—translation.
"Guide to the Expression of Uncertainty in Measurement", First Edition 1995, 55 pages, 1995.
Sakuragi "System Simulator for Structural Description and Error Analysis of Multimodal 3D Data Integrated Systems" Electronics and Communicationsin Japan, Part 2 vol. 90 No. 8, Jan. 2004.

* cited by examiner

*Primary Examiner*—M Good Johnson
(74) *Attorney, Agent, or Firm*—ARC IP Law, PC; Joseph J. Mayo

(57) ABSTRACT

In a method of and a system for determining inaccuracy information (600) in positioning a data model (1) of virtual information in an augmented reality system, the data model (1) is projected to the image plane of a display device (4) for mixing with visual impressions of a real environment. The inaccuracy information is calculated from parameters (10-0 to 50-2, 40, 50, 60) in a mapping computing process by means of which the data model (1) is projected to the image plane of the display device (4). It is thus possible to indicate relative precise inaccuracy information in positioning the data model in an augmented reality system.

23 Claims, 6 Drawing Sheets

METHOD OF AND SYSTEM FOR DETERMINING INACCURACY INFORMATION IN AN AUGMENTED REALITY SYSTEM

This application claims priority to German Patent Application Serial No. DE 10 2005 061 952.5 filed 23 Dec. 2005 the specification of which is hereby incorporated herein by reference.

BACKGROUND OF THE INVENTION

1. Field of the Invention

The present invention relates to a method of determining inaccuracy information in positioning a data model of virtual information in an augmented reality system. In doing so, the data model is projected to the image plane of a display device and mixed or blended with visual impressions of a real environment. In addition thereto, the present invention relates to a corresponding system for determining inaccuracy information in positioning a data model of virtual information in an augmented reality system.

2. Description of the Related Art

So-called augmented reality systems are commonly known. These permit the superposition of computer-generated virtual information with visual impressions of the real environment. To this end, the visual impressions of the real world are mixed with virtual information, e.g. by means of semi-transmissive data glasses worn on the head of a user. The blending-in of virtual information or objects can be effected in context-dependent manner, i.e. matched to and derived from the respective real environment viewed. As virtual information, it is basically possible to use any type of data, such as texts, images etc. The real environment is detected e.g. with the aid of a camera carried on the head of the user. An example of a possible application of an augmented reality system in a production environment is shown in publication DE 101 28 015 A1. The latter describes an augmented reality system for planning altered production environments in the field of production industry.

Furthermore, there are known measuring methods in an augmented reality system. In this regard, e.g. statements on absolute positions of virtual objects are generated in the camera view. In addition thereto, statements on relative positions of virtual objects e.g. with respect to a real object may be generated in the camera view. The structures, advantageously points or areas, for which a statement is to be made, are chosen manually. This is effected e.g. by selection of the desired structure by the user in the camera view, advantageously via mouse clicks to the corresponding locations in the image, by indication of corresponding three-dimensional coordinates or by definition of virtual planes. In case of real objects, the reference for this selection are the 2D projections of the same in the image, and in case of virtual objects, the three-dimensional representation of the same having the real environment superposed thereon.

The accuracy of the measurement statements is based on the deviation between an actual position and a reference or ideal position of virtual objects in the camera view. In this respect, the reference position corresponds to the position that would be taken by the virtual object in a virtual world that is perfectly computed, i.e. is an accurate image of the real world. The reference position of the virtual object thus presents itself as the position that would be taken by the real counterpart of the same in the camera image. A deviation of the actual position is caused by factors afflicted with inaccuracies.

The German Industrial Standard ("DIN") ENV 13005, "Leitfaden zur Angabe der Unsicherheit beim Messen" ("Guideline for indicating of uncertainty in measurement"), German version ENV 13005, 1999, represents a guideline with the purpose of recommending an internationally uniform procedure for determining and indicating measurement uncertainties. This DIN standard relates to the indication and determination of uncertainty of measurement results in the general field of technology. Uncertainty in this regard is understood as the parameter associated with the measurement result, which defines the variance of the values that may be reasonably associated with the measured. The parameter may be a standard deviation of a range having a fixed level of confidence. More details in this regard can be found in the afore-mentioned DIN standard.

Due to the afore-mentioned inaccuracies in an augmented reality system, only inaccurate positioning of the virtual object is possible in general. Due to the fact that the exact deviation of the actual position from the reference position of the virtual object is unknown, a measurement statement can be made in the form of an estimate only, which however satisfies the requirements of the DIN standard in insufficient manner only. The systems known from the prior art in this regard involve the disadvantage that, for such measurements, it is so far not possible to make statements on the uncertainty of the result. If the measurement result is just an estimation of the actual value, the indication of the measurement result is complete only if it is accompanied by the indication of the measurement uncertainty of the estimated value, as specified in the DIN standard.

Ronald T. Azuma: "A Survey of Augmented Reality", Hughes Research Laboratories (1995), pages 1 to 40, reveals a survey on the subject of augmented reality as well as augmented reality systems, discussing also tracking and registration techniques by means of which a data model of virtual information is projected on the image plane of a display device. Furthermore, said documents describes static and dynamic error sources resulting in registration errors in augmented reality systems. Georg Klein, Tom Drummond: "Robust Visual Tracking for Non-Instrumented Augmented Reality", ISMAR '3, 2003, original pages 113 to 122, pages 1 to 10, also is concerned with registration errors in augmented reality systems, with this document dealing in particular with the compensation of errors caused by motion blur in motion models. In said document, the correction of the errors relates in particular to the superposition of a (virtual) re-projection of an object with the actual object in the image plane. The correction in this regard aims at keeping the two-dimensional registration error low and at optically optimizing the superposition.

BRIEF SUMMARY OF THE INVENTION

It would thus be beneficial to provide a method of determining inaccuracy information for a measurement statement in positioning a data model of virtual information in an augmented reality system.

In the method of determining inaccuracy information in positioning a data model of virtual information in an augmented reality system according to the invention, the inaccuracy information is computed on the basis of parameters in a mapping computing process by way of which the data model is projected to the image plane. By means of the augmented reality system, the data model is projected to the image plane of the display device for being mixed with visual impressions of a real environment.

The invention thus permits the provision of a method of determining relatively exact inaccuracy information in positioning a data model in an augmented reality system. The inaccuracy statement may be tailored specifically to the situation at hand and is made dependent upon parameters having an effect on the inaccuracy statement of the scene at hand. Such an inaccuracy statement, in the opposite manner, of course permits a conclusion to a corresponding accuracy statement. According to the invention, those parameters are recognized as decisive which are used in the mapping computing process by means of which the data model is projected to the image plane of the display device, in particular parameters in the mapping computing process starting from the definition of a virtual coordinate system serving for positioning the virtual data model. For example, when a relative deviation between two structures is to be ascertained, these parameters present themselves from the computing processes resulting in the two structures—advantageously points or areas—between which the deviation is present. In this regard, the reference position is the camera image of the real three-dimensional structure on the image plane and a subsequent distortion. The actual position is the 2D projection of the positioned virtual 3D structure. Due to the fact that these measurements are carried out in the digital image, both structures, according to an embodiment of the invention, are transformed so as to provide a pixel-accurate statement.

According to an embodiment, for example, an image of at least part of the real environment is taken by means of a camera, for mixing the same with the virtual data model. According to another embodiment, a so-called see-through augmented reality system is employed. In this context, a distinction can be made in particular between two variations of see-through augmented reality systems. In case of video see-through augmented reality, a video screen is located in front of the eyes of the user, on which real and virtual visual impressions are mixed. In case of optical see-through, such mixing is effected by a so-called optical mixer—a semi-transparent display device in front of the eyes of the user in which the real world is visible due to the transparency of the device and the superposition of virtual information is effected by way of projection to the display device.

A possible application for the method according to the invention is e.g. the production industry. In this regard, it is to be checked e.g. for an existing production whether a new operating means or product, which so far is available in the form of a virtual model only, can be utilized for the same. Due to the fact that, for many production environments, there are no complete and correct models available, an augmented reality system based on such visual information augmentation is well suited for such an investigation. For superposing the real view of the production environment with the virtual model of the operating means or product, e.g. markers are applied to locations where the real object is to be inserted later on. The virtual data model then may be positioned with respect to such a defined virtual world coordinate system. Such a virtual data model, according to an embodiment, has in general a model coordinate system of its own. For application for a vehicle body, the origin of such a model coordinate system e.g. is located between the wheels of the front axle of the model. Placing of the data model in this event is effected in addition via a transformation between the virtual world coordinate system and the model coordinate system.

For examining the use in a real production or facility environment, measurements are taken at locations of interest in the production environment. To this end, a camera takes a picture or image of at least part of the real environment, and the user selects e.g. points in the virtual data model projected into the image which are of particular interest due to their arrangement or function. In the scope of exact positioning of the virtual data model, the exact deviation of the actual position of the data model from the reference (ideal) position shall be ascertained.

For determining exact inaccuracy information, in particular the following influencing factors have been identified according to the invention: first of all, the uncertainty in determining the virtual world coordinate system, as well as the uncertainty in determining camera parameters and the uncertainties arising in the relative positioning of the virtual data model with respect to the virtual world coordinate system.

The determination of the virtual world coordinate system in general is effected on the basis of data of a tracking system. In this regard, the prior art reveals various tracking systems used in connection with augmented reality systems. These tracking systems are based e.g. on optical, magnetic or inertial sensors or combinations of the same. The task thereof within the augmented reality system is the generation of a statement on the user's view of the real world and thus the determination of a transformation between a designated global coordinate system and the virtual world coordinate system. For example, in case of marker-based optical tracking, the global coordinate system corresponds in particular to the camera coordinate system, and the determined transformation transforms this global coordinate system into the virtual world coordinate system defined by the marker. Visual information augmentation items then are positioned in the camera view on the basis of the thus defined virtual world coordinate system.

According to an embodiment of the invention, the computing process is carried out using a tracking system to obtain tracking information which, as described hereinbefore, serves to display the data model in a specific position. The method according to the invention comprises the following steps: processing data of the tracking system, processing data of a camera calibration yielding information on camera parameters of the camera, as well as processing situation-specific data yielding information on the representation of the data model with respect to a virtual coordinate system, in particular the virtual world coordinate system and/or model coordinate system.

These steps, in particular with respect to the processing of data of a camera calibration, may be carried out analogously also with regard to a see-through display device used instead of the camera, wherein data of a see-through calibration are processed analogously, yielding information on parameters of the see-through display device. By way of such calibration, the parameters are ascertained in known manner, and on the basis of these, the data model is blended-in in the see-through display device. These parameters specify in particular in what manner the image of the real environment is displayed on the see-through display device, e.g. semi-transparent data glasses.

Thus, the statements made hereinbefore and hereinafter with respect to camera calibration and camera parameters are applicable in analogous manner also for a see-through display device utilized instead of a camera and the calibration of the same, respectively.

In particular, the data of the tracking system contain information on the measurement inaccuracy of the tracking system, the data of the camera calibration contain information on the measurement inaccuracy of the camera calibration, and the situation-specific data contain information on the inaccuracy of the representation of the data model with respect to the virtual coordinate system.

In accordance with a further embodiment of the invention, information on an uncertainty defining a variance is generated as inaccuracy information. In addition thereto, inaccuracy information containing an error value may be generated. Thus, for complete indication of the measurement result, a related inaccuracy of the result may be indicated. The system and method according to the invention thus permits the complete indication of the measurement result by computation of the corresponding uncertainty and the corresponding error.

In accordance with a further embodiment of the invention, the inaccuracy information determined by the method and system according to the invention may contain a statement on an absolute position of a point, a contour or an area of the data model. In addition thereto or as an alternative, the inaccuracy information may contain a statement on the relative position of a point, a contour or an area of the data model with respect to another structure.

Further embodiments and effects of the invention are indicated in the dependent claims.

BRIEF DESCRIPTION OF THE DRAWINGS

The invention will be explained in more detail hereinafter by way of the Figures shown in the drawing, in which.

DETAILED DESCRIPTION OF THE INVENTION

Figure 1:
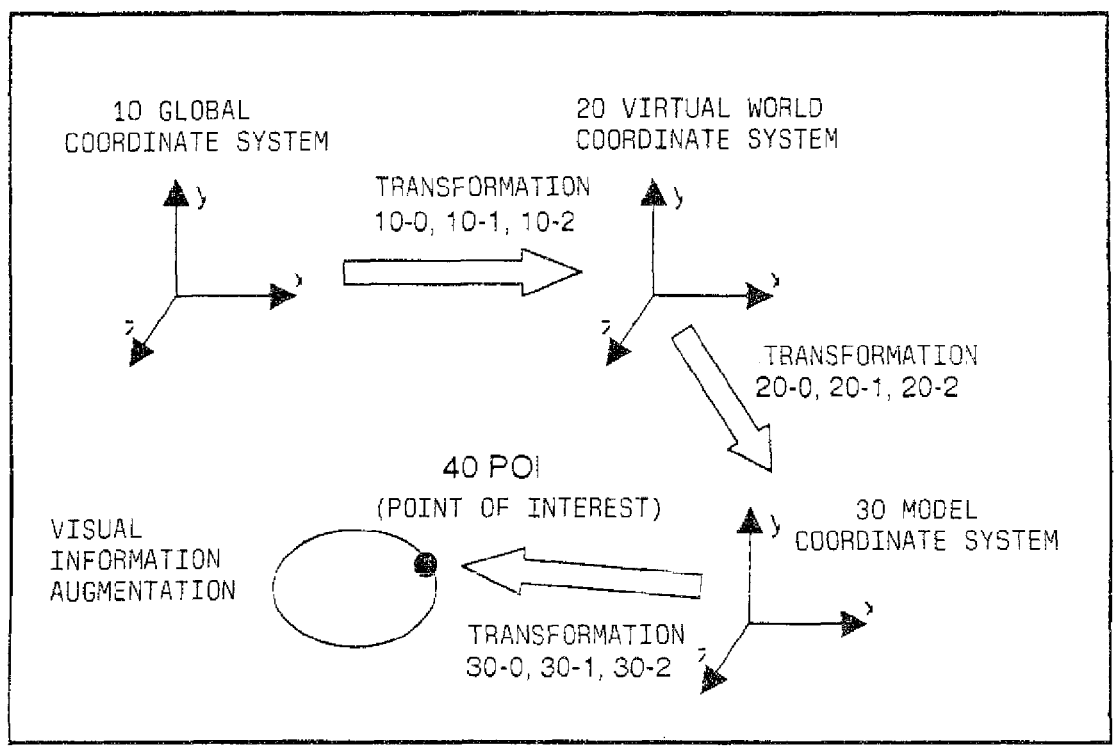
FIG. 1 shows a schematic outline representation of a process for positioning a data model of virtual information in an augmented reality system according to an embodiment, pointing out the respective transformations to be carried out.

FIG. 1 shows a schematic outline representation of a process for positioning a data model of virtual information in an augmented reality system according to an embodiment. A camera takes a picture or image of the part of interest of the real environment, and the image is represented e.g. on a display device for having virtual information superposed thereon. As an alternative, it is also possible to make use of a see-through display device, as described hereinbefore, and by means of such a see-through display device the data model is blended or mixed with at least part of the real environment. Thus, the statements made in the following with respect to a camera apply analogously also for a see-through display device used instead of a camera. In this context, the term see-through calibration is used in general for optical see-through only, as the user in that event actually performs this calibration via see-through. In case of video see-through, the superposition takes place in a camera image, so that the term camera calibration will be used in that event.

Numeral 10 designates a global coordinate system which, e.g. in case of marker-based optical tracking as described hereinbefore, corresponds to a camera coordinate system. By determining the transformation 10-0 (comprising 3D translation and rotation components) with respect to the global coordinate system 10, a virtual world coordinate system 20 is defined. The virtual data model then may be positioned in the camera view on principle on the basis of this thus defined virtual world coordinate system 20. However, in the present embodiment, a model coordinate system 30 is defined in addition by a transformation 20-0 from the virtual world coordinate system 20 to this model coordinate system 30. Accordingly, the placement of the data model is effected in addition via the transformation 20-0. For the measurement inaccuracy information of interest, the user selects e.g. points or contours in the virtual data model, such as e.g. point 40 ("point of interest": POI). Such a point 40 is determined in relation to the model coordinate system 30 via a transformation 30-0.

Figure 2:
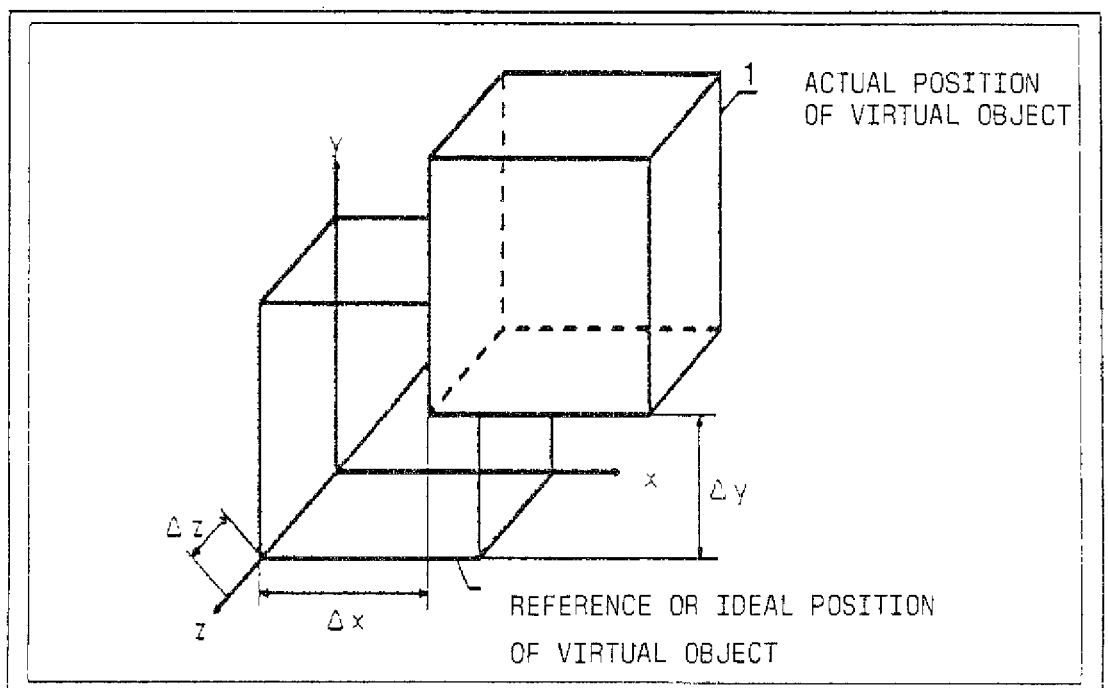
FIG. 2 shows a schematic comparison view of a data model of virtual information in the actual position and in a reference or ideal position corresponding to an ideal state in positioning the data model, as well as the deviation of the same.

FIG. 2 shows a schematic comparison between a data model in the actual position and the reference position. The accuracy of the measurement statements is based on the deviation between the actual position and the reference position of the virtual data model 1 in the camera view. In this regard, the reference position corresponds to the position that would be taken by the data model 1 in a virtual world that is perfectly calculated and thus is an exact image of the same. The reference position of the virtual data model 1 thus presents itself as the position that would be taken e.g. by the real counterpart of the same in the camera view. A deviation of the actual position is generated by factors having an effect in the positioning process of the virtual object that are inflicted with uncertainties. The following factors with such effect have been identified according to the invention:

the uncertainty in determining the virtual world coordinate system, the uncertainty in determining the camera parameters, the uncertainties involved in relative positioning of the virtual object with respect to the virtual world coordinate system.

In connection with FIG. 1, the relative positioning of the virtual data model is performed advantageously by a chain of two transformations. By way of the definition of the model coordinate system 30 in relation to the virtual world coordinate system 20, the coordinate system origin and axis alignment can be determined in advantageous manner. The positioning of the virtual data model then takes place with the aid of the model coordinate system 30. By way of the translation 30-0, an arbitrary point 40 may then be determined for which a measurement is to be carried out.

The uncertainty in determining the virtual world coordinate system 20 is marked by an error 10-1 of the transformation 10-0 and by an uncertainty 10-2. The transformation 20-0 furthermore comprises an error 20-1 and an uncertainty 20-2. Moreover, there are inaccuracies arising in the transformation 30-0 from the model coordinate system 30 to the point 40 of interest, in particular an error 30-1 of transformation 30-0 and an uncertainty 30-2.

Figure 3:
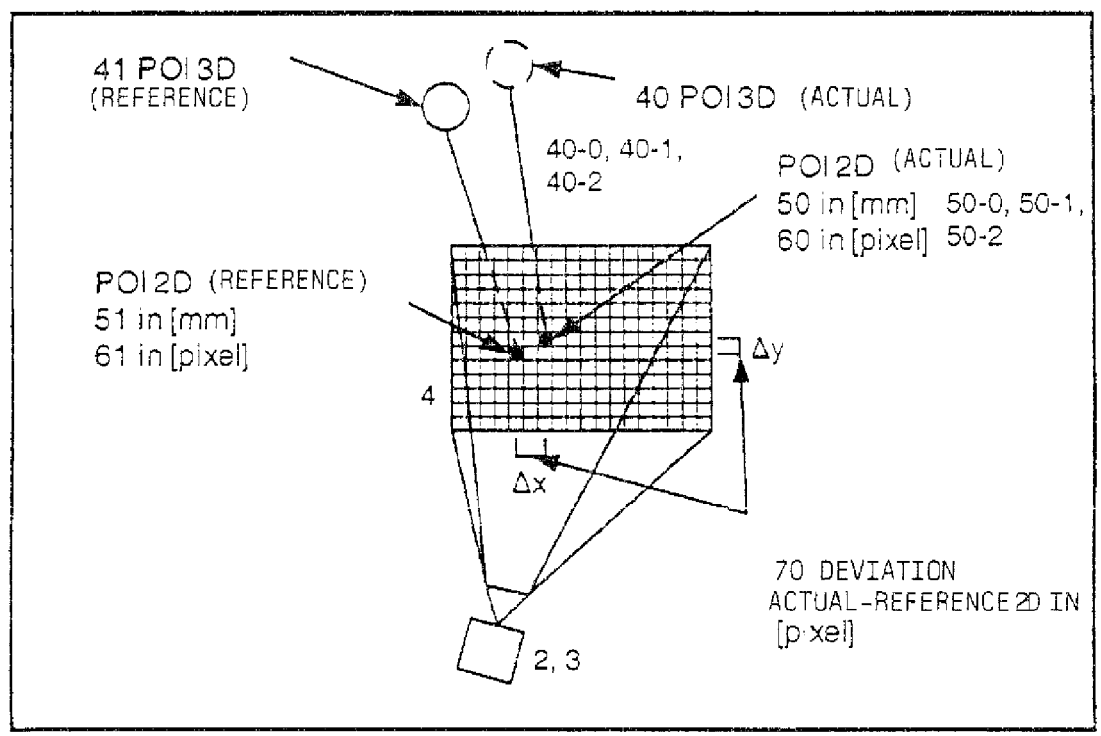
FIG. 3 shows another schematic representation of a process for mapping a virtual data model on an image plane of a display device and a comparison view of an actual position and a reference position of a selected structure of the data model and the deviation of the same.

In FIG. 3, there is shown another schematic representation of a process for mapping a virtual data model on an image plane of a display device 4, e.g. a screen or semi-transparent data glasses. There is just shown a selected structure of the data model in the form of point 40, with point 40 being mapped to a corresponding point 50 in the image plane of the display device 4. The corresponding augmented reality system comprises a means for positioning and projecting the data model on the image plane of the display device 4, with the means according to an embodiment being present in the form of a camera 2 and in the form of a data processing means 3 which, in FIG. 3, are represented as one uniform functional block. The data processing means 3 in this embodiment serves in cooperation with the camera 2 as a means for computing the inaccuracy information as output by module 400 according to FIG. 4 and FIG. 5. The modules described by way of FIGS. 4 and 5 to this effect are implemented in corresponding manner in the data processing device 3. The same holds analogously also for the utilization of a see-through display device in cooperation with the data processing device 3.

According to FIG. 3, numeral 50-0 designates the transformation for transforming the POI 2D 50 from millimeter to a pixel representation. Due to this transformation 50-0, the POI 2D is obtained in the form of a pixel representation. This transformation 50-0 in turn may be inflicted with an error 50-1 based on error components of the camera calibration. The transformation 50-0 and the error 50-1, respectively, likewise is inflicted with an uncertainty 50-2 based on uncertainty components of the camera calibration. In like manner, the transformation 40-0 for projecting the POI 3D 40 to the 2-D representation of POI 2D 50 is inflicted with an error or uncertainty, respectively. The projection transformation 40-0 is based on components of camera calibration. Error 40-1 of the projection transformation 40-0 is based on error components of the camera calibration, while uncertainty 40-2 is based on uncertainty components of the camera calibration. Numerals 41, 51 and 61 designate the corresponding reference positions of the POI in comparison with each other. The deviation approximated from the measurement inaccuracy calculation according to the method according to the invention is represented in a pixel plane and is designated 70 (Δx, Δy) in FIG. 3 in exemplary manner.

Figure 4:
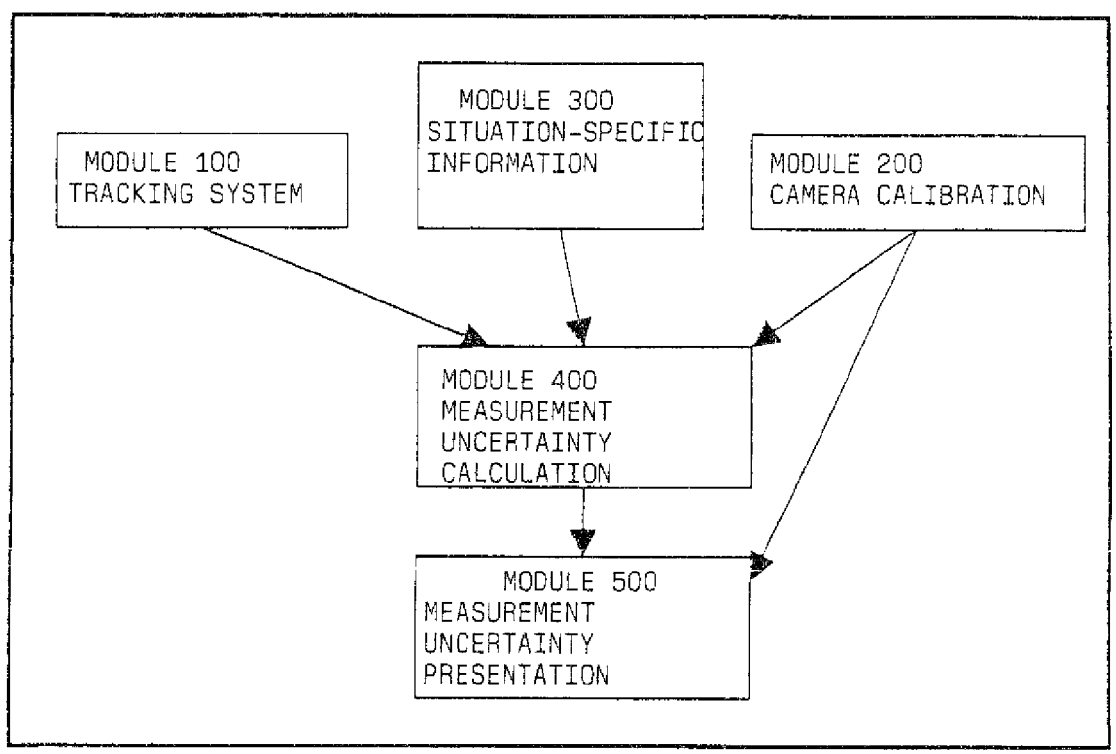
FIG. 4 shows a flow chart according to an embodiment of the invention for determining inaccuracy information in positioning a virtual data model in an augmented reality system in the form of an outline view.

FIG. 4 illustrates a flow chart for determining inaccuracy information in positioning a data model in an augmented reality system according to an embodiment of the invention. The method according to the invention is implemented via a measurement uncertainty module 400 linking data of the tracking system 100 used with data of the camera calibration 200 and situation-specific data 300 and thus determining an uncertainty statement for the situation at hand.

The following data are fed from modules 100, 200 and 300 into the measurement uncertainty module 400:

The external tracking system 100 delivers information on the current view of the world:

the transformation 10-0 determined, which transforms the global coordinate system 10 to the virtual world coordinate system 20.

optionally a statement concerning transformation error 10-1 and a statement concerning the uncertainty 10-2 of this transformation 10-0 or of error 10-1, respectively.

Uncertainty in this regard is understood to be the parameter associated with the measurement result, which characterizes the variance of the values that may be reasonably associated with the measured. The parameter may be a standard deviation or a range having a fixed confidence level, as determined in said DIN standard. For example, a parameter is referred to as error, which e.g. may be the result of a systematic error in the external tracking system. For example, it is ascertained that the external tracking system each time delivers values deviating from the actual position by a specific amount. When this amount at all times ranges within a certain magnitude, the amount is processed as transformation error in the instant case.

The camera calibration module 200 delivers information on the camera used:

the intrinsic camera parameters ascertained, such as e.g. the focal length, optionally a statement on the error of the parameters and a statement on the uncertainty of these parameters or of the error, respectively.

The situation-specific data of module 300 serve for exact determination of the current configuration for which an uncertainty statement is to be determined. These data comprise:

the transformation 20-0 transforming the virtual world coordinate system 20 to the model coordinate system 30, the translation 30-0 describing the selected point 40, for which the uncertainty statement is to be computed, in the model coordinate system 30, and optionally statements on error 20-1 of transformation 20-0 and error 30-1 of translation 30-0, statements on the uncertainty 20-2 of this transformation 20-0 or of said error 20-1 and on the uncertainty 30-2 of this translation 30-0 or of said error 30-1.

The situation-specific data of module 300 are specified e.g. by the user.

The parametrization of modules 100, 200 and 300 permits a detailed description of the situation at hand and thus to make an exact statement on the measurement uncertainty for the configuration described. Basically, a distinction can be made between two configurations for the measurement uncertainty module 400:

In a first configuration, the measurement uncertainty is determined for a selected point (in general for a selected structure). For this configuration, the parameters are to be indicated in accordance with the lists given hereinbefore. The output of module 400 in the present embodiment comprises the measurement error at point 40, which is described by the statements in module 300, and its related measurement uncertainty. With the aid of this result, a confidence interval can be determined within which the selected point is located with a certain likelihood. Accordingly, a statement is generated on an absolute position of point 41, i.e. the reference position of point 40.

In a second configuration, the determination of the measurement uncertainty is effected e.g. between two points. In that event, the input of module 300 has to be carried out for each of the two points. The output of module 400 corresponds to the measurement error between two defined points and the related measurement uncertainty. Thus, a statement is obtained on the error and uncertainty of the relative position (the distance) between the points. As in case of the first configuration, a confidence interval may be defined here too on the basis of the data given.

Figure 5:
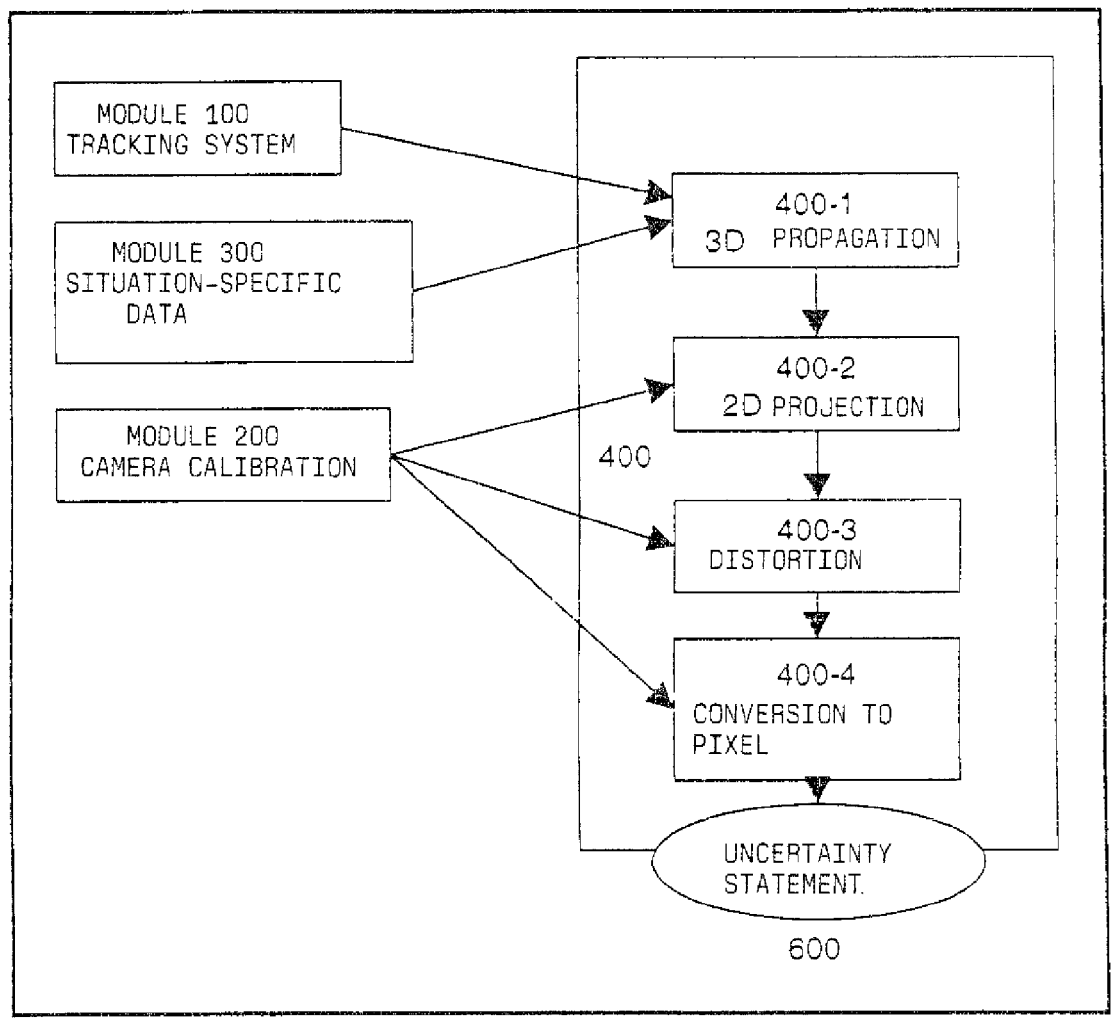
FIG. 5 shows a more detailed flow chart for determining inaccuracy information in positioning a virtual data model in an augmented reality system according to an embodiment of the invention.

FIG. 5 illustrates a detailed flow diagram for determining inaccuracy information in positioning a data model in an augmented reality system according to an embodiment of the invention. The inaccuracy information is output in the form of an uncertainty statement 600 of the module 400 for measurement uncertainty computation. In this regard, the uncertainty statement 600 is determined in essence via the following propagation steps: first of all, a selected structure of the data model in three-dimensional space is determined. This propagation step is also referred to as propagation in 3-D space with respect to the structure selected. This is effected in particular in module 400-1. Thereafter, a projection of the position inaccuracy information of the selected structure of the data model in the image plane is effected. This is performed in particular in module 400-2.

In particular, for determining the position inaccuracy information in three-dimensional space, data such as uncertainty 10-2 and error 10-1 of tracking system 100 are processed, these data containing information on the measurement inaccuracy of the tracking system. In addition thereto, situation-specific data 300 are processed containing information on the inaccuracy of the representation of the data model with respect to the virtual coordinate system 20, 30.

For providing a more detailed description of these operations, an advantageous implementation of the measurement uncertainty computation module 400 will be described in the following. The initial error of the tracking system 100 and the variance of the same will be propagated further over several steps in the process of the computation. Each case makes use of the same principle (principle of error and uncertainty propagation):

The starting point is the mapping for the current propagation step on the basis of a mapping function $f$. This function in each propagation step maps a structure p on p'. In a perfect case—without any influence of uncertainty—this function or map is $p'=f(x_1,x_2,\ldots,x_k)=f(p,x_2,\ldots,x_k)$, in which $X_2\ldots,X_k$ represent additional variables (variable vectors) having an effect on the particular propagation. However, as each variable is inflicted with an error e, the altered mapping $p'+e_{p'}=f(p,e_p,x_2,e_{x_2},\ldots,x_k,e_{x_k})$ results. It is thus possible to indicate the error for the respective entire propagation step as $$e_{p'}=f(p,e_p,x_2,e_{x_2},\ldots,x_k,e_{x_k})-p'.$$

In this regard, there is a distinction made between two cases:

When an error is present in a first case, the uncertainty j0-2 is the uncertainty of error j0-1 (according to the embodiment j=1, ..., 5 in each case):

$$e_{p'}=f(p,e_p,x_2,e_{x_2},\ldots,x_k,e_{x_k})-p'.$$

The propagation of the error covariance in three-dimensional space results by way of the following sum:

$$C' = \sum_{i=1}^{k} J_i C_i J_i^T$$

with $C_i$ being covariance matrices for the variable vectors $e_{x_i}$ and $$J_i = \frac{\partial e_{p'}}{\partial e_{x_i}}$$

being corresponding Jacobian matrices.

As it is presumed in the preceding formulas that errors are present, the covariances of the errors are computed.

When there is no error present in a second case, the uncertainty j0-2 is the uncertainty of the transformation j0-0 (in which j=1, ..., 5 each time):

$$p'=f(x_1,x_2,\ldots,x_k)=f(p,x_2,\ldots,x_k)$$

The propagation of the error covariance in three-dimensional space then results by way of the following sum:

$$C' = \sum_{i=1}^{k} J_i C_i J_i^T$$

with $C_i$ being covariance matrices for the variable vectors $x_i$ and $$J_i = \frac{\partial f}{\partial x_i}$$

being corresponding Jacobian matrices.

The respective uncertainty j0-2, as indicated hereinbefore, thus at all times designates the uncertainty of the respective transformation j0-0, unless a related error j0-1 is indicated or processed. However, if there is a related error j0-1 indicated, the respective uncertainty j0-2 relates to the respective error j0-1.

Figure 6:
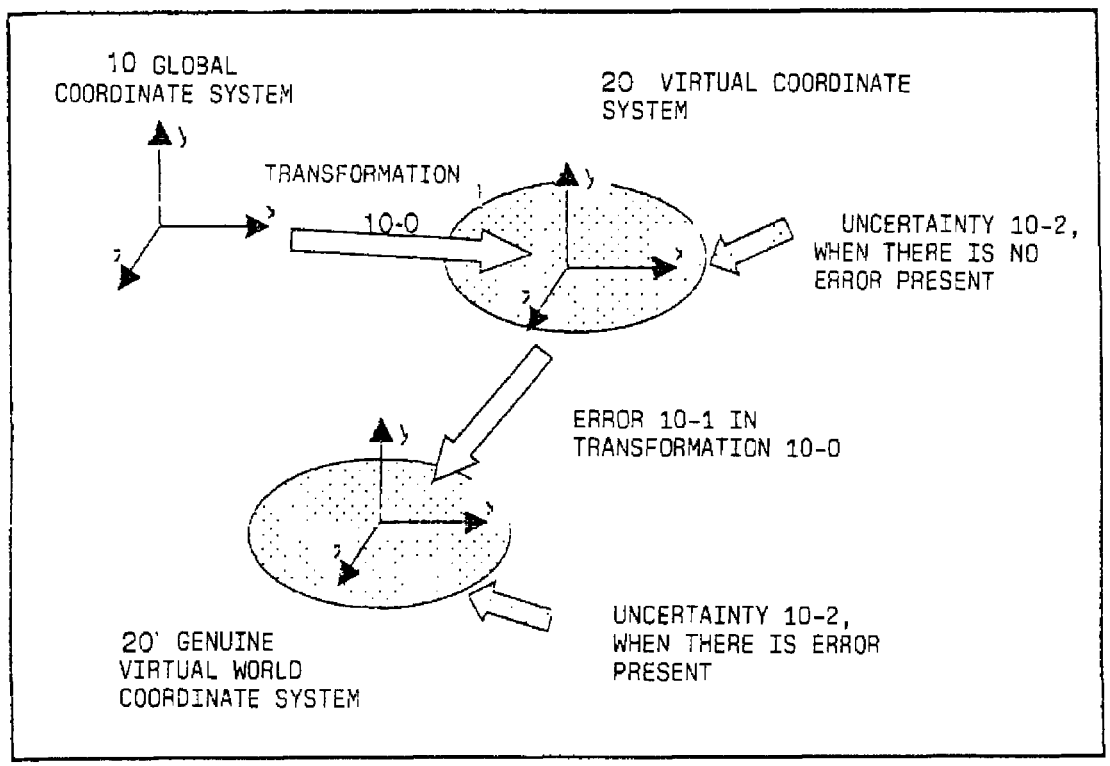
FIG. 6 shows a schematic outline representation similar to FIG. 1 for explaining the terms "uncertainty" and "error" used.

These two possibilities will be better understood in particular in connection with FIG. 6. The error can be determined only when the actual value for the measurement is known, in the instant case the pose of the virtual world coordinate system. When this actual value is known, a deviation may be determined for each measurement, and on the basis of the error average and variance (10-1 and 10-2) can be determined.

In the following, there are given the formulas for determining the expected or expectation value (error average) $\epsilon$ and the covariance matrix C (e.g. from the afore-mentioned DIN standard):

$$\text{Expected value } \varepsilon = \frac{1}{n}\sum_{k=1}^{n}\left(p_k^{tatsächlich} - p_k^{Tracking}\right) = \frac{1}{n}\sum_{k=1}^{n}\Delta p_k$$

wherein $p_k^{actual}$ designates the current or actual pose entry, $p_k^{tracking}$ designates the pose entry determined by the tracking system and n designates the number of measurements.

The covariance matrix is $C=\sigma_{ij}$ $$\text{wherein } \sigma_{ij} = \frac{1}{n-1}\sum_{k=1}^{n}(\Delta p_k(i) - \varepsilon(i))(\Delta p_k(j) - \varepsilon(j))$$

in which $\Delta p_k=(\Delta p_k(1),\Delta p_k(2),\Delta p_k(3),\ldots)$ and $\epsilon=(\epsilon(1),\epsilon(2),\epsilon(3),\epsilon(4),\ldots)$ with pose entries for the various translations (1), (2), (3) and rotations (4), (5), (6) (and possibly (7) in case a quaternion is present).

However, in case the current pose entry is not known, the average value and variance for the pose only may be determined directly.

The global coordinate system e.g. corresponds to the origin of the camera. By means of the marker, the user defines a "genuine" virtual world coordinate system. The tracking system recognizes the marker, but returns a transformation 10-0 that is not fully correct. It describes the virtual world coordinate system 20 used for the further computations. It is not always possible to determine the error 10-1 describing the deviation between 20 and the actual virtual world coordinate system (cf. preceding statements).

In this context, the variable vectors each comprise a set of correlated parameters which (stochastically) are dependent upon each other and have a common covariance matrix. More detailed information in this regard can be found in the aforementioned DIN standard and, with exclusive reference to computation processes within a tracking system, in "Analysis of Head Pose Accuracy in Augmented Reality", William Hoff and Tyrone Vincent, IEEE Transactions on Visualization and Computer Graphics, Vol. 6, No. 4, 2000.

According to the present invention, the individual propagation steps for determining inaccuracy information in positioning a virtual data model in an augmented reality system are as follows:

propagation in 3D space to the selected structure (point, contour or area),
projection to 2D,
distortion,
conversion to pixels.

For propagation in 3D space, the initial error and the initial uncertainty of the same from module 100 of the tracking system are linked with the user-specified uncertainties of the relative position of the 3D structure of interest (e.g. point 40 in FIG. 3) in the virtual coordinate system 20, 30, which are provided from module 300, in accordance with the general principle described hereinbefore. The position error for the desired 3D structure, i.e. in the instant case for the desired 3D point 40, and the related uncertainty are thus determined.

In the present embodiment, the error in 3D space for point 40 results from the transformations from the global coordinate system 10 to POI 40 and the related errors. Consequently, the following individual propagation steps, in which the mapping functions $f_1$ to $f_3$ may be different for the particular propagation step, are as follows:

$$e_{40} = f_1(10\text{-}0, 10\text{-}1, 20\text{-}0, 20\text{-}1, 30\text{-}0, 30\text{-}1) - 40$$

Point 40 is selected by the user, e.g. by clicking on the corresponding position.

The covariance matrix of the error is computed by weighted summing up of the covariances of the individual errors.

$$C^{40} = J_{10\text{-}1} C_1 J_{10\text{-}1}^T + J_{20\text{-}1} C_2 J_{20\text{-}1}^T + J_{30\text{-}1} C_3 J_{30\text{-}1}^T$$

wherein $$C_1 = 10 - 2,\ C_2 = 20 - 2,\ C_3 = 30 - 2 \text{ and } J_i = \frac{\partial e_{40}}{\partial i}$$

In the next propagation step, error and uncertainty (referred to in general as positioning inaccuracy information) of the 3D point are projected to the image plane in consideration of the intrinsic camera parameters inflicted with uncertainty. In this connection, uncertainties are introduced into the propagation both by the projection as such and by the subsequent distortion process:

$$e_{50} = f_2(40, e_{40}, 40\text{-}0, 40\text{-}1) - 50$$

$$C^{50} = J_{e_{40}} C^{40} J_{e_{40}}^T + J_{40\text{-}1} C_4 J_{40\text{-}1}^T$$

wherein $$C_4 = 40 - 2$$

and $$J_i = \frac{\partial e_{50}}{\partial i}$$

Finally, in a last propagation step the conversion into pixels is performed, again in consideration of the vague camera parameters.

$$e_{60} = f_3(50, e_{50}, 50\text{-}0, 50\text{-}1) - 60$$

$$C^{60} = J_{e_{50}} C^{50} J_{e_{50}}^T + J_{50\text{-}0} C_5 J_{e_{50\text{-}0}}^T$$

wherein $$C_5 = 50 - 2$$

and $$J_i = \frac{\partial e_{60}}{\partial i}$$

This step reflects the measurement on the pixel plane, as the structures manually selected for the measurement statement can be positioned with pixel-accuracy only. Thus, the deviation resulting due to the propagated error and its uncertainty for the point selected, will be rounded to entire pixels.

The indication of the final uncertainty is composed of the propagated error $e_{60}$ and the related uncertainty $C^{60}$ in the form of the standard deviation.

The measurement uncertainty presentation module in the module 500 (FIG. 4) fulfils an advantageous additional functionality of the system and method according to the invention. For providing a user-suited measurement statement, the final result of the uncertainty computation is converted in this module from a pixel-based indication to a millimeter-based indication. On the basis of the deviation and uncertainty computed on a pixel basis, a re-projection to the 3D space is used for generating a statement for the originally selected 3D structure, e.g. by way of measures corresponding to the real 3D space. This process step no longer is part of the actual uncertainty propagation, but constitutes an application-specific extension of the system and method described presenting the computed data in a form that is better understandable to the user.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. A method of determining inaccuracy information (600) for providing a measurement statement in positioning a data model (1) of virtual information in an augmented reality system, comprising:

taking an image of at least part of the real environment by means of a camera (2, 3);

projecting said data model (1) to an image plane of a display device (4) for mixing with the image of the at least part of the real environment;

using a tracking system (100) in obtaining tracking information (10-0, 10-1, 10-2) for defining a virtual coordinate system (20, 30) based on which the data model is projected to the image plane of the display device and serving to map said data model (1) at a specific position in said image;

processing data of said tracking system (100);

processing data of a camera calibration (200) providing information on camera parameters of said camera;

processing situation-specific data (300) providing information on representation of said data model (1) with respect to the virtual coordinate system (20, 30);

computing by a data processing device said inaccuracy information from an uncertainty in determining the virtual coordinate system, an uncertainty in determining the camera parameters and uncertainties arising in the relative positioning of the data model with respect to the virtual coordinate system.

2. The method of claim 1 further comprising:

wherein said display device is implemented as a see-through display device (4);

wherein said camera calibration comprises see-through calibration (200).

3. The method of claim 2 wherein said data of said tracking system (100) contains information on measurement inaccuracy (10-1, 10-2) of said tracking system;

said data of said camera calibration (200) or said see-through calibration contain information on measurement inaccuracy of said camera calibration or said see-through calibration, respectively; and, said situation-specific data (300) contains information on inaccuracy of said representation of said data model with respect to said virtual coordinate system.

4. The method of claim 1 wherein said inaccuracy information (600) contains information on an uncertainty, particularly defining a variance.

5. The method of claim 1 wherein said inaccuracy information (600) contains an error value.

6. The method of claim 1 wherein said inaccuracy information (600) is determined via the following propagation steps:

determining (400-1) positioning inaccuracy information for at least a selected structure (40) of said data model (1) in three-dimensional space; and, projecting (400-2) said positioning inaccuracy information of said selected structure (40) of said data model in said image plane (4).

7. The method of claim 6 wherein said determining (400-1) said positioning inaccuracy information in said three-dimensional space comprises:

processing data (10-1, 10-2) of a tracking system (100) containing information on a measurement inaccuracy of said tracking system as well as situation-specific data (300) containing information on an inaccuracy of representation of said data model (1) with respect to a virtual coordinate system (20, 30).

8. The method of claim 6 wherein said projecting (400-2) of said positioning inaccuracy information of said selected structure (40) of said data model to said image plane (4) is carried out in consideration of intrinsic camera parameters or in consideration of parameters of a see-through display device.

9. The method of claim 6 wherein subsequent to said projection (400-2) of said positioning inaccuracy information to said image plane, propagating (400-3) is carried out for taking into consideration a distortion process in projecting said positioning inaccuracy information.

10. The method of claim 6 further comprising propagating (400-4) in which a conversion of said projected positioning inaccuracy information into a pixel representation is carried out.

11. The method of claim 6 further comprising:

processing tracking information (100) containing data on an uncertainty (10-2) of said tracking information;

processing calibration data (200) of a camera calibration or see-through calibration containing data on an uncertainty of camera parameters or parameters of a see-through display device, respectively; and, processing situation-specific data (300) containing data on an uncertainty (20-2, 20-3) of representation of said data model (1) with respect to a virtual coordinate system (20, 30).

12. The method of claim 6 wherein said positioning inaccuracy information (600) contains information on a measurement uncertainty, particularly defining a variance.

13. The method of claim 6 wherein said positioning inaccuracy information (600) contains a positioning error.

14. The method of claim 1 wherein processed inaccuracy information (500) is generated via re-projecting said inaccuracy information (600) to three-dimensional space.

15. The method of claim 1 wherein said inaccuracy information (600) contains a statement on an absolute position of a point (41, 51, 61), a contour or an area of said data model (1).

16. The method of claim 1 wherein said inaccuracy information (600) contains a statement on a relative position of a point (40, 50, 60), a contour or an area of said data model (1) with respect to another structure.

17. The method of claim 1 further comprising:

providing tracking information (100) for defining a virtual coordinate system (20, 30) upon which said data model (1) is projected to said image plane of said display device (4), said virtual coordinate system (20, 30) being determined via a transformation (10-0) with respect to a global reference coordinate system (10) of a tracking sensor;

providing calibration data (200) for providing intrinsic camera parameters of a camera or parameters of a see-through display device; and, providing situation-specific data (300) providing information on representation of said data model (1) with respect to said virtual coordinate system (20, 30) providing translation information (30-0) describing a selected structure (40) of said data model, for which inaccuracy information is to be generated, in said virtual coordinate system (20, 30).

18. The method of claim 17 wherein said tracking information (100) contains data on an error (10-1) of said transformation (10-0), and/or said calibration data (200) contain data on an error of said intrinsic camera parameters or said parameters of said see-through display device, respectively, and/or said situation-specific data (300) contains data on an error (20-1, 30-1) of said translation information (30-0).

19. The method of claim 17 wherein said tracking information (100) contains data on an uncertainty (10-2) of said transformation (10-0) or of a related error (10-1), said calibration data (200) contains data on an uncertainty of said intrinsic camera parameters or said parameters of said see-through display device, respectively, or of a related error, and said situation-specific data (300) contains data on an uncertainty (20-2, 30-2) of said translation information (30-0) or of a related error (30-1).

20. A method of determining inaccuracy information (600) for providing a measurement statement in positioning a data model (1) of virtual information in an augmented reality system comprising:
- projecting said data model (1) to an image plane of a display device (4); and, mixing with visual impressions of a real environment, with said inaccuracy information being computed from parameters (10-0 to 50-2, 40, 50, 60) in a mapping computing process from which said data model (1) is projected to said image plane of said display device (4) in which an image is taken of at least part of the real environment by means of a camera (2, 3) and said mapping computing process is carried out using a tracking system (100) to obtain tracking information (10-0, 10-1, 10-2) serving to map said data model (1) at a specific position in said image further comprising
- processing data of said tracking system (100),
- processing data of a camera calibration (200) providing information on camera parameters of said camera, and
- processing situation-specific data (300) providing information on representation of said data model (1) with respect to a virtual coordinate system (20, 30).

21. A method of determining inaccuracy information (600) for providing a measurement statement in positioning a data model (1) of virtual information in an augmented reality system comprising:
- projecting said data model (1) to an image plane of a display device (4); and, mixing with visual impressions of a real environment, with said inaccuracy information being computed from parameters (10-0 to 50-2, 40, 50, 60) in a mapping computing process on the basis of which said data model (1) is projected to said image plane of said display device (4), in which, by means of a see-through display device (4), said data model (1) is mixed with at least part of the real environment and said mapping computing process is carried out using a tracking system (100) to obtain tracking information (10-0, 10-1, 10-2) serving to map said data model (1) at a specific position in said display device, further comprising processing data of said tracking system (100),
- processing data of a see-through calibration (200) providing information on parameters of said see-through display device (4), and
- processing situation-specific data (300) providing information on representation of said data model (1) with respect to a virtual coordinate system (20, 30).

22. A system for determining inaccuracy information for a measurement statement in positioning a data model (1) of virtual information in an augmented reality system, comprising
- a camera (2, 3) configured to take an image of at least part of the real environment;
- a display device (4) configured to display a projection of said data model (1) to an image plane of said display device (4) and to mix said projection of said data model (1) with the image of the at least part of the real environment;
- a tracking system (100) configured to obtain tracking information (10-0, 10-1, 10-2) that defines a virtual coordinate system (20, 30) based on which the data model is projected to the image plane of the display device and further configured to map said data model (1) at a specific position in said image;
- said tracking system further configured to process data of said tracking system;
- said tracking system further configured to process data of a camera calibration (200) that provides information on camera parameters of said camera;
- said tracking system further configured to process situation-specific data (300) that provides information on representation of said data model (1) with respect to the virtual coordinate system (20, 30);
- a data processing device configured to compute said inaccuracy information from an uncertainty in determining the virtual coordinate system, an uncertainty in determining the camera parameters and uncertainties that arise in a relative position of the data model with respect to the virtual coordinate system.

23. The system of claim 22 wherein said wherein said display device is implemented as a see-through display device (4) and wherein said camera calibration comprises see-through calibration (200).

* * * * *